United States Patent
Scheessele (10) Patent No.: US 9,626,150 B2
(45) Date of Patent: Apr. 18, 2017

(54) AUDIO INPUT FROM USER (75) Inventor: Evan Scheessele, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 248 days.

(21) Appl. No.: 14/375,815

(22) PCT Filed: Apr. 27, 2012

(86) PCT No.: PCT/US2012/035538
§ 371 (c)(1),
(2), (4) Date: Jul. 31, 2014

(87) PCT Pub. No.: WO2013/162603
PCT Pub. Date: Oct. 31, 2013

(65) Prior Publication Data
US 2015/0033130 A1    Jan. 29, 2015

(51) Int. Cl.
| | | |
|---|---|---|
| *G06F 3/16* | (2006.01) | |
| *G06F 3/00* | (2006.01) | |
| *G06F 3/01* | (2006.01) | |
| *G06F 3/03* | (2006.01) | |
| *G02B 27/00* | (2006.01) | |

(52) U.S. Cl.
CPC ............... *G06F 3/167* (2013.01); *G06F 3/00* (2013.01); *G06F 3/012* (2013.01); *G06F 3/013* (2013.01); *G06F 3/03* (2013.01); *G02B 27/0093* (2013.01); *G06F 3/017* (2013.01); *G06F 2203/0381* (2013.01)

(58) Field of Classification Search
CPC .... G06F 3/167; G06F 2203/0381; G06F 3/00; G06F 3/03; G06F 3/013; G06F 3/012; G06F 3/017; G02B 27/0093
See application file for complete search history.

(56) References Cited

U.S. PATENT DOCUMENTS

| | | |
|---|---|---|
| 6,118,888 A | 9/2000 | Chino et al. |
| 6,518,561 B1 | 2/2003 | Miura |
| 7,429,108 B2 | 9/2008 | Rosenberg |
| 8,096,660 B2 | 1/2012 | Vertegaal et al. |
| 9,202,105 B1 * | 12/2015 | Wang ................. G06Q 20/4014 |
| 2003/0120494 A1 * | 6/2003 | Jost ......................... G10L 15/22 704/275 |

(Continued)

FOREIGN PATENT DOCUMENTS

| | | |
|---|---|---|
| CN | 101674363 A | 3/2010 |
| JP | H11-024694 | 7/1997 |

(Continued)

OTHER PUBLICATIONS

International Search Report and Written Opinion, International Application No. PCT/US2012/035538, Date of Mailing: Dec. 14, 2012, pp. 1-8.

(Continued)

*Primary Examiner* — Aaron Lowenberger
(74) *Attorney, Agent, or Firm* — HP Inc. Patent Department (57) ABSTRACT

A computing device detects a user viewing the computing device and outputs a cue if the user is detected to view the computing device. The computing device receives an audio input from the user if the user continues to view the computing device for a predetermined amount of time.

17 Claims, 5 Drawing Sheets

(56) References Cited

U.S. PATENT DOCUMENTS

| | | | |
|---|---|---|---|
| 2006/0093161 A1* | 5/2006 | Falcon | H03G 3/3026 |
| | | | 381/104 |
| 2006/0192775 A1 | 8/2006 | Nicholson et al. | |
| 2007/0024579 A1* | 2/2007 | Rosenberg | G06F 3/013 |
| | | | 345/156 |
| 2007/0174060 A1 | 7/2007 | Jost et al. | |
| 2009/0234651 A1* | 9/2009 | Basir | G10L 15/02 |
| | | | 704/254 |
| 2009/0315827 A1 | 12/2009 | Elvesjo et al. | |
| 2010/0312547 A1 | 12/2010 | Os et al. | |
| 2010/0315482 A1 | 12/2010 | Rosenfeld et al. | |
| 2011/0267374 A1 | 11/2011 | Sakata | |
| 2011/0310001 A1 | 12/2011 | Madau et al. | |
| 2012/0062729 A1 | 3/2012 | Hart | |

FOREIGN PATENT DOCUMENTS

| | | |
|---|---|---|
| JP | 2001-070293 | 3/2001 |
| JP | 2002-041084 | 2/2002 |
| JP | 2003-044089 | 2/2003 |
| JP | 2004-192653 | 7/2004 |
| JP | 2007-094104 | 4/2007 |
| TW | 200720991 A | 6/2007 |
| TW | 201033852 A1 | 9/2010 |
| TW | 201216115 A1 | 4/2012 |
| WO | WO-2010089989 | 8/2010 |

OTHER PUBLICATIONS

Jan Van Der Kamp, "Gaze-Based Paint Program with Voice Recognition," Dissertation, University of Dublin, Trinity College, Sep. 2010, pp. 1-95, Available at: <scss.tcd.ie/postgraduate/msciet/current/Dissertations/0910/vanderKamp.pdf>.

Rainer Stiefelhagen et al., "A Model-Based Gaze Tracking System," IEEE International Joint Symposia on Intelligence and Systems, 1996, pp. 1-17, Available at: <cs.cmu.edu/~stiefel/papers/97IJAIT-rainer.pdf.gz>.

Office Action, TW Application No. 102113029, Date Issued: Jan. 19, 2015, pp. 1-8.

consumerreports.org—Sony's Smile Shutter, Nov. 2007 (2 pages).

European Patent Office, European Patent Application 12875680.6, Extended European Search Report dated Nov. 3, 2015 (8 pages).

Wikipedia, Eye tracking, Feb. 9, 2012 (12 pages).

Wikipedia, Face detection, Mar. 20, 2012 (5 pages).

Wikipedia, Facial recognition system, Apr. 2, 2012 (9 pages).

* cited by examiner

AUDIO INPUT FROM USER

This application is a national stage application under 35 U.S.C. §371 of PST/US2012/035538, filed Apr. 27, 2012.

BACKGROUND

When accessing a device to enter an input, such as an audio input, a user can initially use an input component of the computing device, such as a mouse or keyboard, to enable an audio input component of the computing device. The user can continue to access the mouse or keyboard to launch an application on the computing device to receive audio inputs from the user. As the user manipulates the input components, time can be wasted and the user can make mistakes leading to a frustrating user experience.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

A computing device includes a sensor, such as an image capture component, to detect for a user viewing the computing device. For the purposes of this application, the user is viewing the computing device if the sensor detects a face or eyes of the user facing toward the computing device. If the user is viewing the computing device, an output component, such as a visual indicator, an audio output speaker, and/or a haptic-feedback motor can provide a cue to the user. The cue can be a visual, audio, and/or haptic-feedback cue notifying the user that the computing device is ready to receive audio inputs from the user. As the cue is outputted, the computing device can use the sensor to detect for the user viewing the computing device and/or the output component for a predetermined amount of time.

If the computing device determines that the user is continuing to view the computing device for the predetermined amount of time as the cue is outputted, the computing device can confirm that the user would like to interface with the computing device. An audio input component of the computing device, such as a microphone, can then receive an audio input from the user. In one embodiment, when receiving audio inputs, the computing device launches a listening mode of the computing device to enable, unmute, and/or calibrate the audio input component to receive audio inputs from the user. The audio inputs can be a voice command, a voice query, and/or any additional sound generated by the user and received by the computing device as an input. As a result, the user can conveniently interact with the device with audio inputs without physically accessing or manipulating input components of the computing device.

Figure 1:
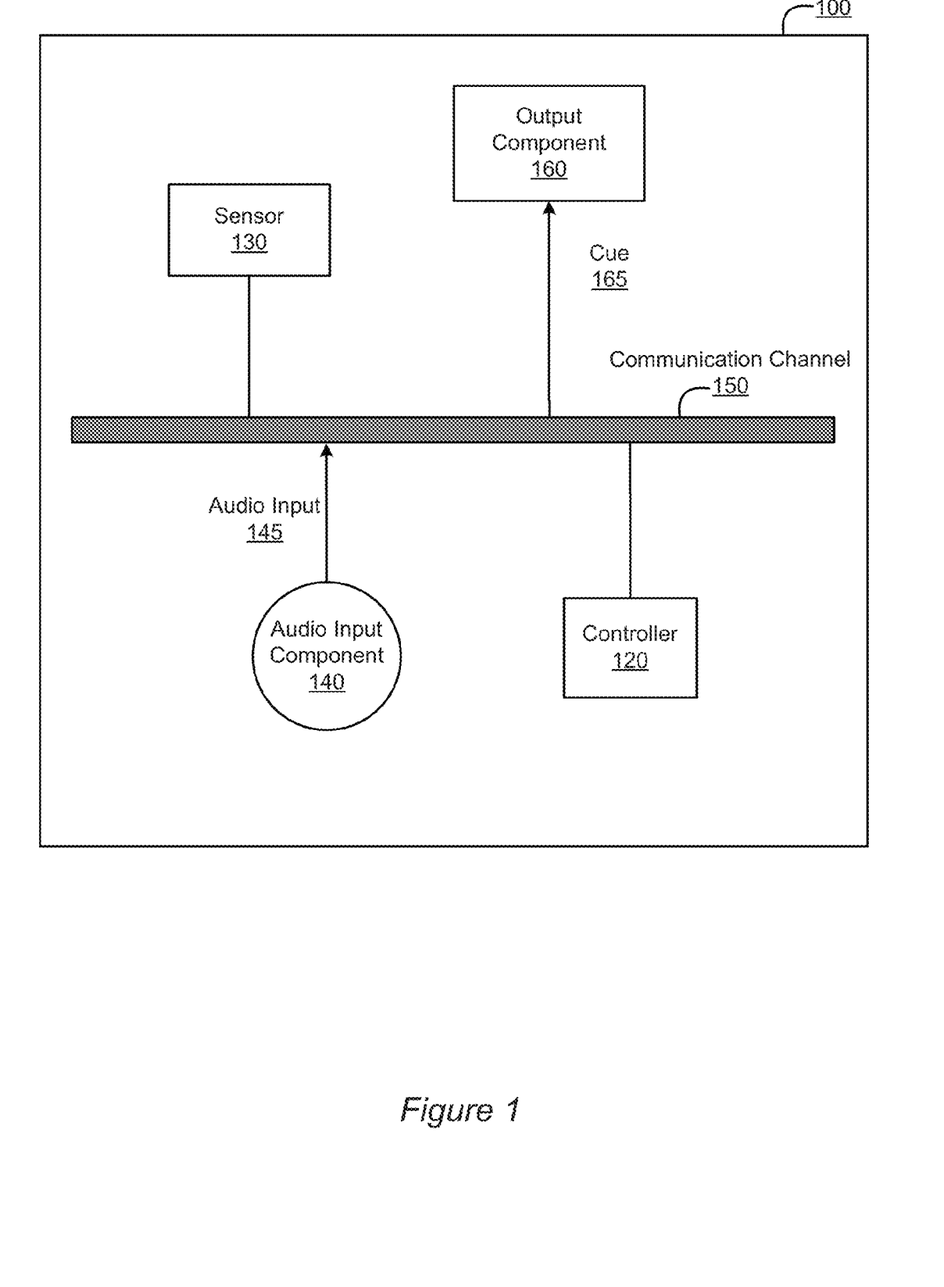
FIG. 1 illustrates a computing device with a sensor, an output component, and an audio input component according to an example.

FIG. 1 illustrates a computing device 100 with a sensor 130, an output component 160, and an audio input component 140 according to an example. In one embodiment, the computing device 100 can be a desktop, a laptop, a notebook, a tablet, a netbook, an all-in-one system, and/or a server. In another embodiment, the computing device 100 can be a cellular device, a PDA (Personal Digital Assistant), an E (Electronic)-Reader, a tablet, a camera, and/or any additional device which can include a sensor 130, an output component 160, and an audio component 140.

The computing device 100 includes a controller 120, a sensor 130, an output component 160, an audio input component 140, and a communication channel 150 for the computing device 100 and/or one or more components of the device 100 to communicate with one another. In one embodiment, the computing device 100 also includes a voice application stored on a non-volatile computer readable medium included in or accessible to the computing device 100. For the purposes of this application, the voice application is an application which can be utilized independently and/or in conjunction with the controller 120 to manage audio input 145 for the computing device 100. For the purposes of this application, audio input 145 includes a voice and/or sound from a user received as an input for the computing device 100.

When managing audio input 145, a sensor 130 can initially be used to detect if a user is viewing the computing device 100. For the purposes of this application, the sensor 130 is a hardware component, such as an image capture component and/or an infrared component, which can capture a view in front of the computing device 100 to detect for a user viewing the computing device 100. Detecting for the user viewing the computing device 100 includes determining whether a face of the user is facing toward the computing device 100. In one embodiment, the controller 320 and/or the voice application can use face detection technology and/or eye-gaze detection technology to determine if a face or eyes of the user is viewing the computing device 100.

If the user is detected to be viewing the computing device 100, the controller 120 and/or the voice application instruct an output component 160 to output a cue 165 to the user. For the purposes of this application, a cue 165 is a signal or notification from the output component 160 to notify the user that the computing device 100 is ready to receive audio input 145 from the user. The output component 160 is a hardware component of the computing device 100 which can provide a visual cue, an audio cue, and/or a haptic-feedback cue to the user. In one embodiment, the output component 160 can be a visual indicator, an audio output speaker, a haptic motor, and/or any additional component which can output a cue 165.

The controller 110 and/or the voice application can use the sensor 130 to detect if the user is viewing the computing device 100 for a predetermined amount of time. The predetermined amount of time can be defined by the controller 120, the voice application, and/or the user. For example, the predetermined amount of time can be defined to be half a second, 2 seconds, or any additional amount of time. If the sensor 130 detects the user continuing to view the computing device 100 for the predefined amount of time, the controller 110 and/or the voice application determine that the user is viewing the computing device 100 for the predetermined amount of time.

In another embodiment, when detecting for the user viewing the computing device 100 for the predetermined amount of time, the sensor 130 can further detect for the user viewing the output component 160 of the computing device 100. The controller 120 and/or the voice application can identify a line of sight of the user to determine if the user is viewing the computing device 100 and/or the output component 160. The controller 120 and/or the voice application can use facial detection technology and/or eye-gaze detection technology to identify the line of sight of the user.

If the user continues to view the computing device 100 and/or the output component 160 for the predetermined amount of time, the controller 120 and/or the voice application can determine that the user's intent is to interact with the computing device 100 and proceed to receive audio input 145 from the user with an audio input component 140. For the purposes of this application, the audio input component 140 is a hardware component, such as a microphone, which can receive audio inputs 145 from the user.

For the purposes of this application, an audio input 145 includes audible sound from the user which the controller 110 and/or the voice application can receive as an input for the computing device 100. For example, the audio input 145 can be a voice command and/or a query to the computing device 100. In one embodiment, receiving audio input 145 includes the controller 120 and/or the voice application launching a listening mode of the computing device 100. For the purposes of this application, the listening mode of the computing device 100 corresponds to an input mode of the computing device 100 to receive audio inputs 145 from the user. If the computing device 100 is in the listening mode, the audio input component 140 is enabled and unmuted to receive the audio input 145.

Figure 2:
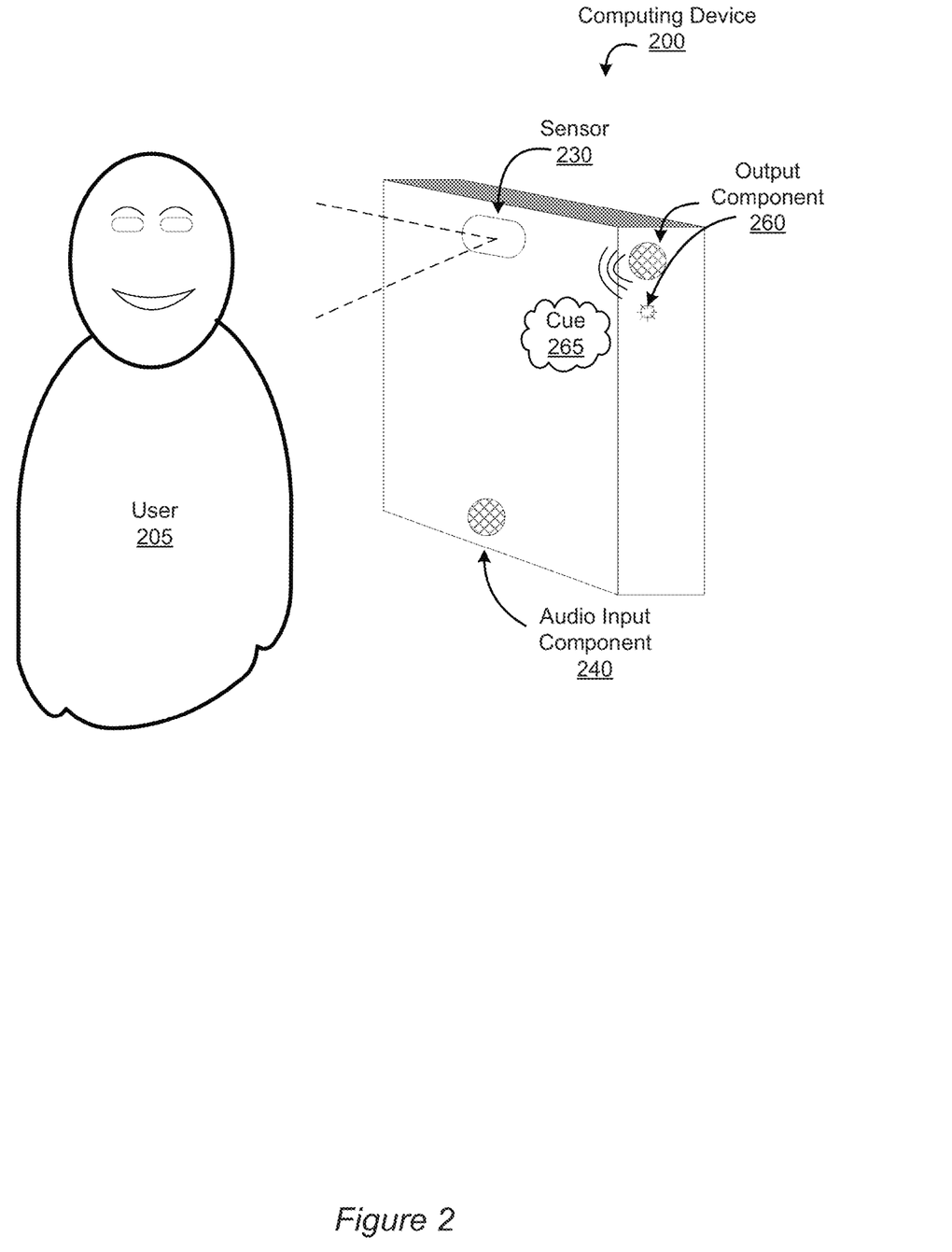
FIG. 2 illustrates an output component outputting a cue and a sensor detecting a user viewing a computing device according to an example.

FIG. 2 illustrates an output component 260 outputting a cue 265 in response to a sensor 230 detecting a user 205 viewing a computing device 200 according to an example. For the purposes of this application, the sensor 230 is a hardware component of the computing device 200 which detects for the user 205 viewing the computing device 200. The sensor 230 can be an image capture component, an infrared component, and/or any additional component which can detect for the user 205 viewing the computing device 200. In one embodiment, the sensor 230 can also detect a physical proximity of the user 205 around the computing device 200. The physical proximity of the user 205 corresponds to a position or distance of the user from the audio input component 240. The user 205 can be any person which can interact with the computing device 200 and enter one or more audio inputs to the computing device 200.

The sensor 230 can initially capture a view in front of the computing device 200 to detect for the user 205. If the user 205 is detected, the controller and/or the voice application can use facial detection technology and/or eye-gaze detection technology to detect if the user 205 is viewing the computing device 200. The controller and/or the voice application can use the facial detection technology and/or the eye-gaze detection technology to determine whether the computing device 200 is within a line of sight of the user 205. If the computing device 200 is within the line of sight of the user, the controller and/or the voice application determine that the user 205 is viewing the computing device 200.

If the user 205 is detected to be viewing the computing device 200, the output component 260 proceeds to output a cue 265 to notify the user 205 that the computing device 200 is ready to receive audio input from the user 205. In one embodiment, the controller and/or the voice application can further determine if the user continues to view the computing device 200 for a predetermined amount of time before instructing the output component 260 to output the cue 265. As noted above, the predetermined amount of time can be defined by the controller, the voice application, and/or by the user 205 to be half a second, 2 seconds, and/or any amount of time.

If the user 205 continues to view the computing device 200 for the predetermined amount of time, the output component 260 can be used to output a cue 265. For the purposes of this application, the output component 260 is a hardware component of the computing device 200, such as a visual indicator, a display component, an audio output speaker, and/or a haptic-motor which outputs the cue 265. The cue 265 includes at least one of a visual signal, an audio signal, a haptic feedback, and/or any additional cue 265 which notifies the user 205 that the computing device 200 is ready to receive audio inputs. For example the visual signal can be a light source illuminating. The audio signal can be an audible tone being outputted. The haptic-feedback can include one or more vibrations.

In one embodiment, the output component 260 is a directional visual indicator with a limited field of view and the cue 265 is outputted to the user 205 based on a position of the user 205. As noted above, the sensor 230 can be used to detect a physical location or proximity of the user 205. The directional visual indicator can include an array of light sources which have a limited field of view. One or more of the light sources within proximity of the user 205 can be illuminated to output the cue 265 for the user 205 to view. Other light sources outside the proximity of the user 205 are not illuminated. As a result, security can be increased for the user 205 and the computing device 200 by outputting the cue 265 within a limited field of view of the cue 265 such that other individuals do not perceive the cue 265 and view the user 205 interacting with the computing device 200.

As the cue 265 is outputted by the output component 260, the controller and/or the voice application determine if the user 205 is viewing the computing device 200 for the predetermined amount of time in association with the cue 265 being outputted. For the purposes of this application, the user 205 can be determined to be viewing the computing device 200 in association with the cue 265 if the user 205 continues to view the computing device 200 as the cue 265 is outputted by the output component 160. For example, if the user 205 continues to view the computing device 200 for the predetermined amount of time in parallel of the cue 265 being outputted, the user 205 is determined to be viewing the computing device 200 in association with the cue 265 being outputted.

In another embodiment, as opposed to viewing the computing device 200, the controller and/or the voice application can detect for the user 205 viewing the output component 260 for the predetermined amount of time in association with the cue 265 being outputted. In other embodiments, the sensor 230 also detects for a change in facial expression of the user 205 or a continuous gaze from the user 205. When detecting for a change in facial expression, the sensor 230 detects for a smile, a frown, a wink, a raised eyebrow, and/or any additional change in facial expression from the user 205. When detecting for the continuous gaze, the sensor 230 detects for the face or eyes of the user 205 continuing to view the computing device 200 or the output component 260 for the predetermined amount of time.

If the user 205 is viewing the computing device 200 and/or the output component 260 for the predetermined amount of time in association with the cue 265 being outputted, the controller and/or the voice application determine that the user would like to interact with the computing device 200 with an audio input. As shown in FIG. 2, an audio input component 240 can be used to detect audio inputs from the user 205. For the purposes of this application, the audio input component 240 is a hardware component, such as a microphone, which detects voice, sounds, and/or noise as an audio input for the computing device 200. In one embodiment, the audio input from the user 205 can be a voice command for the computing device 200 to execute an instruction or command. The instruction or command can be to launch or terminate an application, open or close a file, and/or to dictate alphanumeric text input into email, an application, and/or a web browser.

In another embodiment, the audio input can be a voice query for information from the computing device 200. The query can be for a status of the computing device 200, for a local weather forecast, and/or for information retrievable from the computing device 200 or another device. When capturing a voice command and/or a query from the user 205, the sensor 230 can further capture a view of the user's 205 mouth. The view of the user's 205 mouth can be used by the controller and/or the voice application to improve an accuracy of identifying a voice command and/or a query from the user 205. In other embodiments, the user 205 can use a hand, a body part, and/or an accessory to create audio for the audio input component 240 to receive as an audio input.

Figure 3:
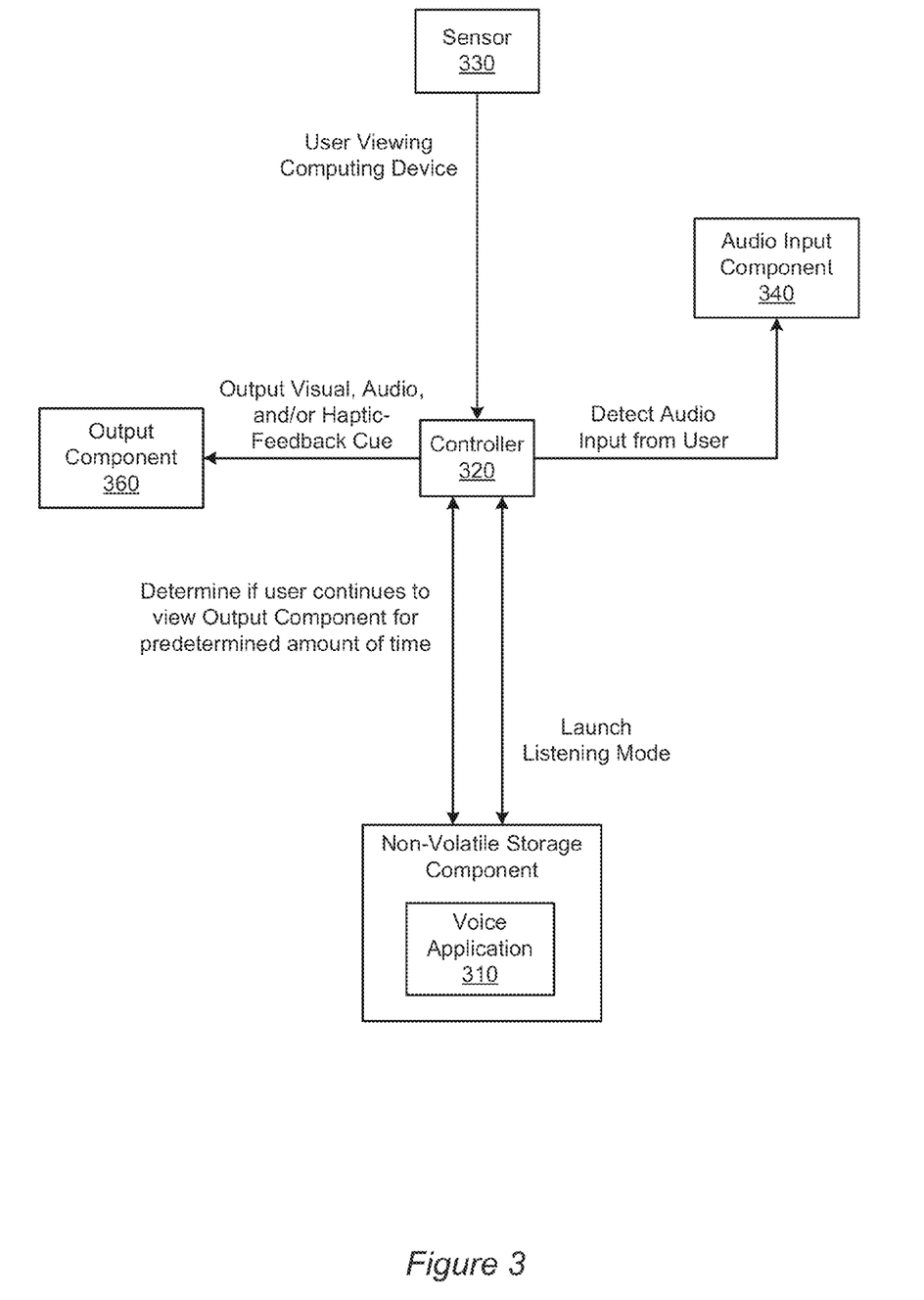
FIG. 3 illustrates a block diagram of a voice application detecting audio input from a user according to an example.

FIG. 3 illustrates a block diagram of a voice application 310 detecting audio input from a user according to an example. As noted above, the voice application 310 can be utilized independently and/or in conjunction with the controller 320 to manage audio input. In one embodiment, the voice application 310 can be a firmware embedded onto one or more components of the computing device. In another embodiment, the voice application 310 can be an application accessible from a non-volatile computer readable memory of the computing device. The computer readable memory is a tangible apparatus that contains, stores, communicates, or transports the application for use by or in connection with the device. In one embodiment, the computer readable memory is a hard drive, a compact disc, a flash disk, a network drive or any other form of tangible apparatus coupled to the computing device.

As shown in FIG. 3, the sensor 330 has detected a user viewing the computing device. In response, the controller 320 and/or the voice application 310 instruct the output component 360 to output a visual, audio, and/or haptic-feedback cue to the user. In one embodiment, as the cue is outputted, the controller 320 and/or the voice application 310 can authenticate the user with facial recognition technology. The controller 320 and/or the voice application 310 can instruct the sensor 330 to capture an image of the user's face and compare the image of the user's face to images of recognized users for the computing device. The images of the recognized users can be locally stored on a storage component of the computing device or on another device accessible to the controller 320 and/or the voice application 310.

In one embodiment, if the image of the user does not match an image of a recognized user, the user fails authentication and the controller 320 and/or the voice application 310 disables a listening mode of the computing device. When disabling the listening mode, the controller 320 and/or the voice application 310 can disable the audio input component 340, mute the audio input component 340, and/or reject any audio input from the user. If the image of the user matches an image of a recognized user, the user will have successfully been authenticated and the controller 320 and/or the voice application 310 proceed to determine if the user continues to view the computing device or the output component for a predetermined amount of time.

If the user is determined to be viewing the computing device and/or the output component for the predetermined amount of time, the controller 320 and/or the input application 310 determine that the user would like to interact with the computing device and proceed to launch the listening mode. In another embodiment, the controller 320 and/or the voice application 310 can further detect for a continuous gaze or a change in facial expression from the user as the user continues to view the computing device and/or the output component. By detecting the continuous gaze or change in facial expression, the controller 320 and/or the voice application 310 can further confirm the intent of the user to interact with the computing device.

The controller 320 and/or the voice application 310 can then launch the listening mode of the computing device. When launching the listening mode, the controller 320 and/or the voice application 310 can enable the audio input component 340 and unmute the audio input component 340 to receive audio inputs from the user. In one embodiment, when launching the listening mode, the controller 320 and/or the voice application load a speech profile associated an identity of the user. For the purposes of this application, the speech profile includes information of the user's voice or speech pattern which the controller 320 and/or the voice application 310 use to improve detection and recognition of an audio input from the user. The information can include a pitch of the user's voice, a rate which the user speaks, an annunciation of the user's speech, and/or any additional information of the user's voice or speech pattern.

In one embodiment, the controller 320 and/or the voice application 310 also instructs the sensor 330 to detect a physical proximity of the user relative to the audio input component 340. As noted above, the physical proximity of the user corresponds to a position or distance of the user from the audio input component 340. Based on the position and distance of the user, the controller 320 and/or the voice application 310 can calibrate the audio input component 340 to improve an accuracy of detecting audio inputs from the user. Calibrating the audio input component 340 can include directing the audio input component 340 to receive audio input from a position of the user. In another embodiment, calibrating the audio input component 340 can include applying a noise filtering or cancellation algorithm based on the position and/or distance of the user.

In response to detecting audio inputs from the user, the controller 320 and/or the voice application 310 identify a command, instruction, input, and/or query of the computing device associated with the audio input from the user. In one embodiment, as the audio input is detected by the audio input component 340, the sensor 330 can also capture a view of the user's mouth. By capturing the view of the user's mouth, an accuracy of identifying commands, instructions, and/or queries of the computing device corresponding to the audio input can be improved. The view of the user's mouth can also be used as a prompt for the audio input component 340 to start receiving audio inputs from the user.

Figure 4:
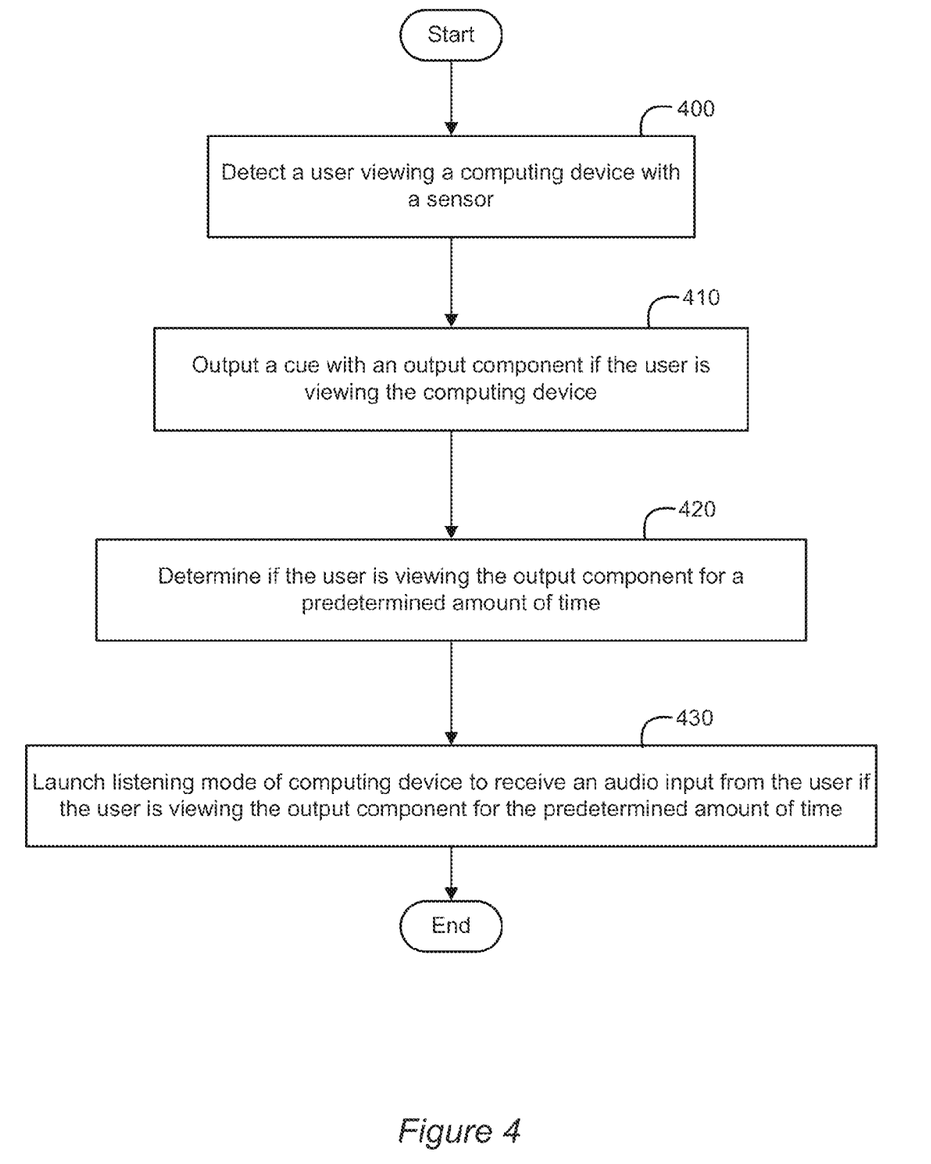
FIG. 4 is a flow chart illustrating a method for detecting audio input according to an example.

FIG. 4 is a flow chart illustrating a method for detecting audio input according to an example. A sensor, such as in image capture component, can initially detect for a user viewing the computing device at 400. If the user is viewing the computing device, the controller and/or the voice application can instruct an output component, such as a visual indicator, audio speaker, and/or a haptic-motor to output a visual, audio, and/or haptic feedback cue at 410. The cue can be used to notify the user that the computing device is ready to launch a listening mode to receive audio inputs from the user. As the cue is outputted, the controller and/or the voice application can determine if the user is continuing to view the output component for a predetermined amount of time as the cue is outputted at 420. If the user continues to view the output component for the predetermined amount of time, the controller and/or the voice application determine that the user would like to enter a voice command and/or query and a listening mode of the computing device is launched for an audio input component to receive an audio input from the user at 430. The method is then complete. In other embodiments, the method of FIG. 4 includes additional steps in addition to and/or in lieu of those depicted in FIG. 4.

Figure 5:
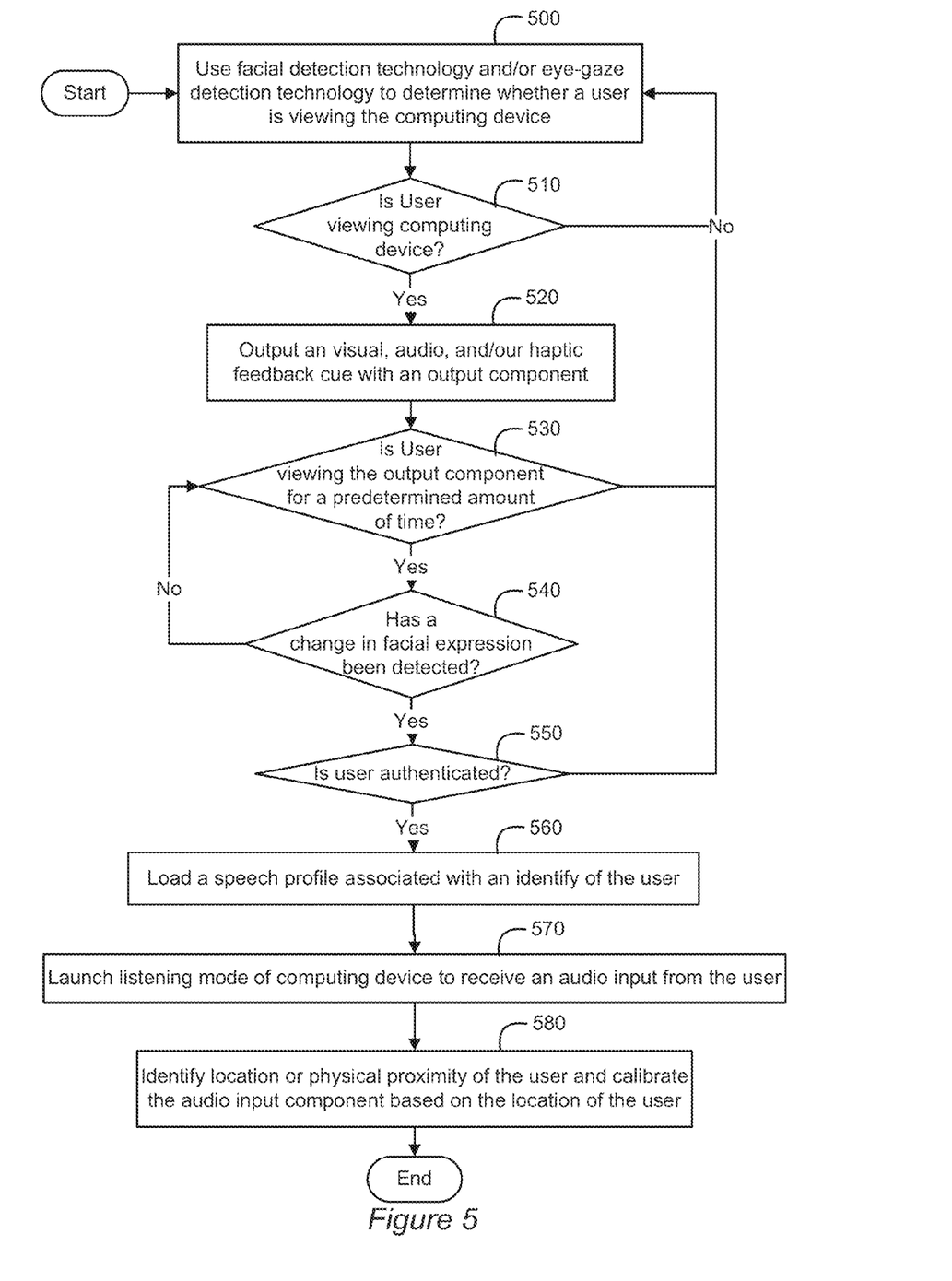
FIG. 5 is a flow chart illustrating a method for detecting audio input according to an example.

FIG. 5 is a flow chart illustrating a method for detecting audio input according to an example. A sensor, such as an image capture component, can be used to capture view of a user and the controller and/or the voice application can use facial detection technology and/or eye-gaze detection technology to determine whether the user is viewing the computing device at 500. The controller and/or the voice application detect if the user is viewing the computing device by determining if a face of the user is facing towards the computing device and/or if an eye-gaze of the user is viewing the computing device at 510. If the user is not viewing the computing device, the controller and/or the voice application continue to detect for the user viewing the computing device at 500.

If the user is determined to be viewing the computing device, an output component can be used to output a visual, audio, and/or haptic feedback cue to notify the user that the computing device is ready to launch a listening mode at 520. As the cue is outputted, the controller and/or the voice application can determine if the user continues to view the output component for a predetermined amount of time at 530. If the user does not view the output component for the predetermined amount, the controller and/or the voice application continue to detect for the user viewing the computing device at 500.

In one embodiment, if the user is determined to be viewing the output component for the predetermined amount of time, the controller and/or the voice application can determine if a change in facial expression, such as a raised eyebrow, a wink, and/or a smile, has been detected on the user at 540. If no change in facial expression is detected, the controller and/or the voice application continue to determine whether the user is viewing the output component for the predetermined amount of time at 530. If a change in facial expression is detected, the user can then be authenticated with facial recognition technology at 550. If the user fails authentication, a listening mode is not launched and the controller and/or the voice application continue to detect whether another user is viewing the computing device at 500.

If the user is successfully authenticated, the controller and/or the voice application load a speech profile associated with an identity of the user at 560. The speech profile is used to improve detection and recognition of an audio input from the user. The controller and/or the voice application can then launch the listening mode of the computing device by enabling an audio input component, such as a microphone, to receive an audio input from the user at 570. In one embodiment, the sensor and/or the audio input component can also identify a physical proximity of the user and proceed to calibrate the audio input component based on the physical proximity of the user at 580. In another embodiment, as the listening mode launched, the controller and/or the voice application can also disable other forms of input on the computing device, such as touch inputs, keyboard inputs, mouse inputs, and/or other forms of input for the computing device. The method is then complete. In other embodiments, the method of FIG. 5 includes additional steps in addition to and/or in lieu of those depicted in FIG. 5.

What is claimed is:

1. A computing device comprising:
a sensor to detect a user viewing the computing device;
an output device to output a cue in response to detecting the user viewing the computing device; and
a controller to:
determine if the user has viewed the computing device for a predetermined amount of time;
authenticate the user using facial recognition in response to determining that the user has viewed the computing device for the predetermined amount of time;
in response to successfully authenticating the user:
launch a listening mode of the computing device to receive an audio input from the user with a hardware audio input component,
load a speech profile of the user, the speech profile comprising information of a speech pattern of the user, and
recognize a command in the audio input from the user using the information of the speech pattern in the speech profile; and
disable the listening mode of the computing device in response to failing to authenticate the user.

2. The computing device of claim 1, wherein the cue is selected from among a visual signal, an audio signal, and a haptic feedback, the cue indicating to the user that the computing device is ready to launch the listening mode to receive audio inputs.

3. The computing device of claim wherein the audio input is a voice command or query from the user.

4. The computing device of claim 1, wherein the output device is selected from among a visual indicator, an audio speaker, and a haptic-motor to output the cue.

5. The computing device of claim 1, wherein the information of the speech pattern of the user comprises information of a pitch of a voice of the user and information of a rate at which the user speaks.

6. The computing device of claim 1, wherein the controller is to:
authenticate the user using the facial recognition based on an image of a face of the user.

7. The computing device of claim 6, wherein the controller is to authenticate the user in response to detecting a change in facial expression of the user.

8. The computing device of claim 1, wherein the controller is to:
detect a position and distance of the user from the computing device; and
calibrate the hardware audio input component based on the position and the distance of the user.

9. A method of a computing device, comprising:
detecting, using a sensor, a user viewing the computing device;
outputting a cue with an output component in response to detecting the user viewing the computing device;
determining if the user has viewed the computing device for a predetermined amount of time;

authenticating the user with facial recognition technology in response to determining that the user has viewed the computing device for the predetermined amount of time;
in response to successfully authenticating the user:
   launching a listening mode of the computing device to receive an audio input from the user with a hardware audio input component,
   loading a speech profile of the user, the speech profile comprising information of a speech pattern of the user, and
   recognizing a command in the audio input from the user using the information of the speech pattern in the speech profile; and
disabling the listening mode of the computing device in response to failing to authenticate the user.

10. The method of claim 9,
wherein the speech profile of the user is associated with an identity of the user determined from successfully authenticating the user.

11. The method of claim 9, further comprising:
detecting, by the computing device, a position and distance of the user from the computing device; and
calibrating, by the computing device, the hardware audio input component based on the position and the distance of the user.

12. The method of claim 9, wherein disabling the listening mode comprises disabling the hardware audio input component of the computing device such that audio input cannot be received with the hardware audio input component.

13. A non-transitory computer readable medium comprising instructions that if executed cause a controller to:
detect, using a sensor, a user viewing a computing device;
output a cue with an output component in response to detecting the user viewing the computing device;
determine if the user continues to view the output component for a predetermined amount of time in association with the cue being outputted;
authenticate the user using facial recognition in response to determining that the user has viewed the output component for the predetermined amount of time;
in response to successfully authenticating the user:
   launch a listening mode of the computing device to receive an audio input from the user,
   load a speech profile of the user, the speech profile comprising information of a speech pattern of the user, and
   recognize a command in the audio input from the user using the information of the speech pattern in the speech profile; and
disable the listening mode of the computing device in response to failing to authenticate the user.

14. The non-transitory computer readable medium of claim 13, wherein the sensor additionally captures a view of the user's mouth as an audio input component detects the audio input from the user, and the instructions if executed cause the controller to recognize the command further based on the view of the user's mouth.

15. The non transitory computer readable medium of claim 13, wherein the output component includes a directional visual indicator with a limited field of view, and the cue is outputted to the user based on a position of the user.

16. The non-transitory computer readable medium of claim 13, wherein the information of the speech pattern of the user comprises information of a pitch of a voice of the user and information of a rate at which the user speaks.

17. The non-transitory computer readable medium of claim 13, wherein the instructions if executed cause the controller to:
authenticate the user using the facial recognition based on an image of a face of the user.

* * * * *

UNITED STATES PATENT AND TRADEMARK OFFICE
CERTIFICATE OF CORRECTION

| | | |
|---|---|---|
| PATENT NO. | : 9,626,150 B2 | Page 1 of 1 |
| APPLICATION NO. | : 14/375815 | |
| DATED | : April 18, 2017 | |
| INVENTOR(S) | : Evan Scheessele | |

It is certified that error appears in the above-identified patent and that said Letters Patent is hereby corrected as shown below:

In sheet 5 of 5, reference numeral 520, Line 1, delete "and/our" and insert -- and/or --, therefor.

In Column 8, Line 39, in Claim 3, delete "claim wherein" and insert -- claim 1, wherein --, therefor.

In Column 10, Line 23, in Claim 15, delete "non transitory" and insert -- non-transitory --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*